F. E. HARVEY.
DIRIGIBLE AUTOMOBILE LAMP.
APPLICATION FILED DEC. 26, 1916.
1,239,482.
Patented Sept. 11, 1917.
2 SHEETS—SHEET 1.
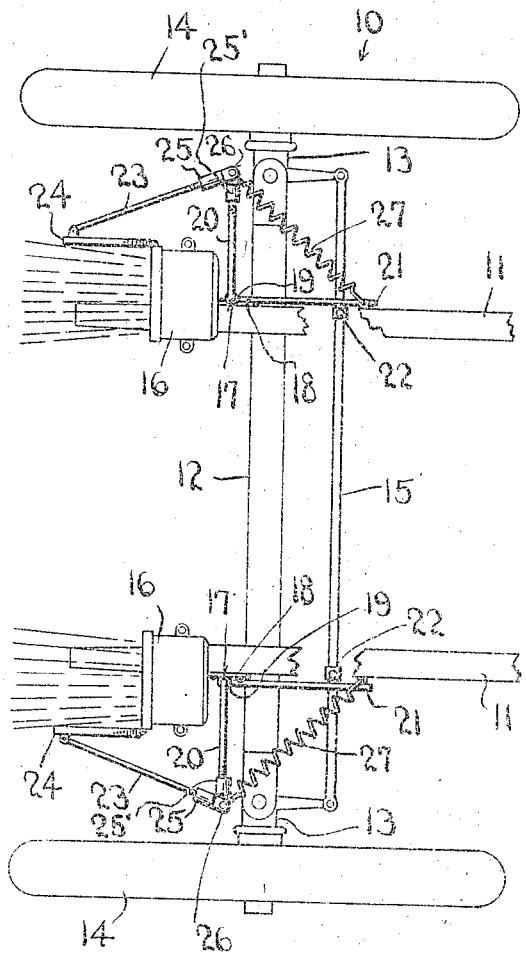
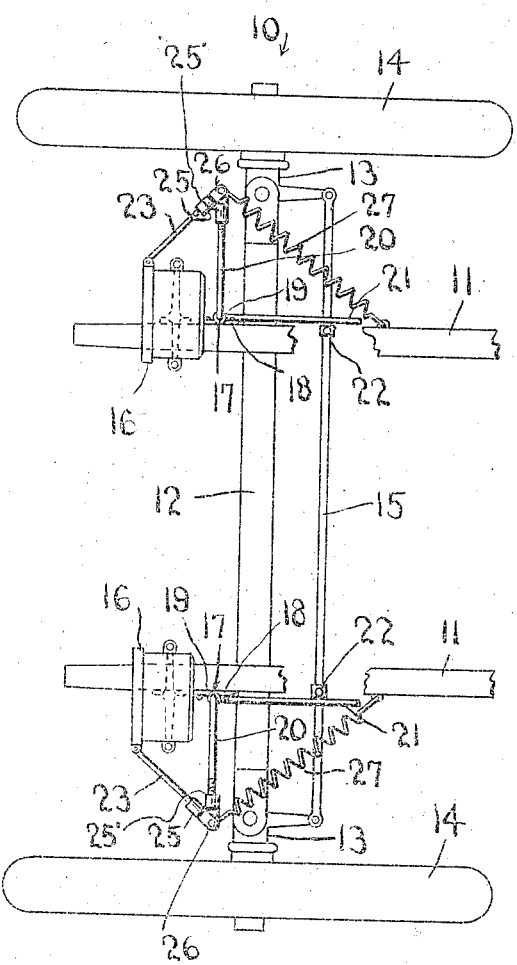
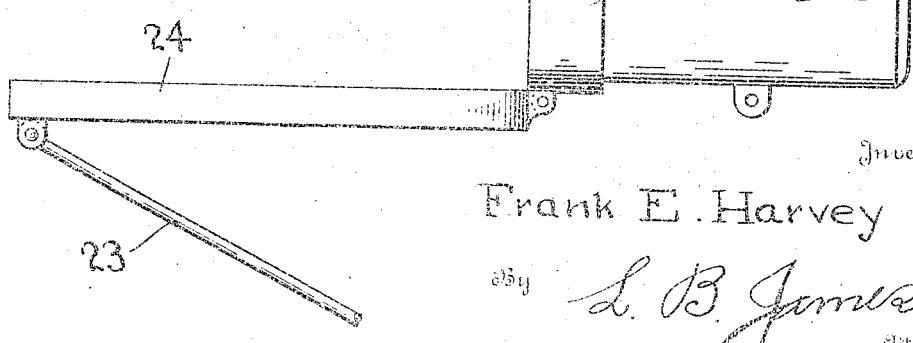
Inventor
Frank E. Harvey
by L. B. James
Attorney

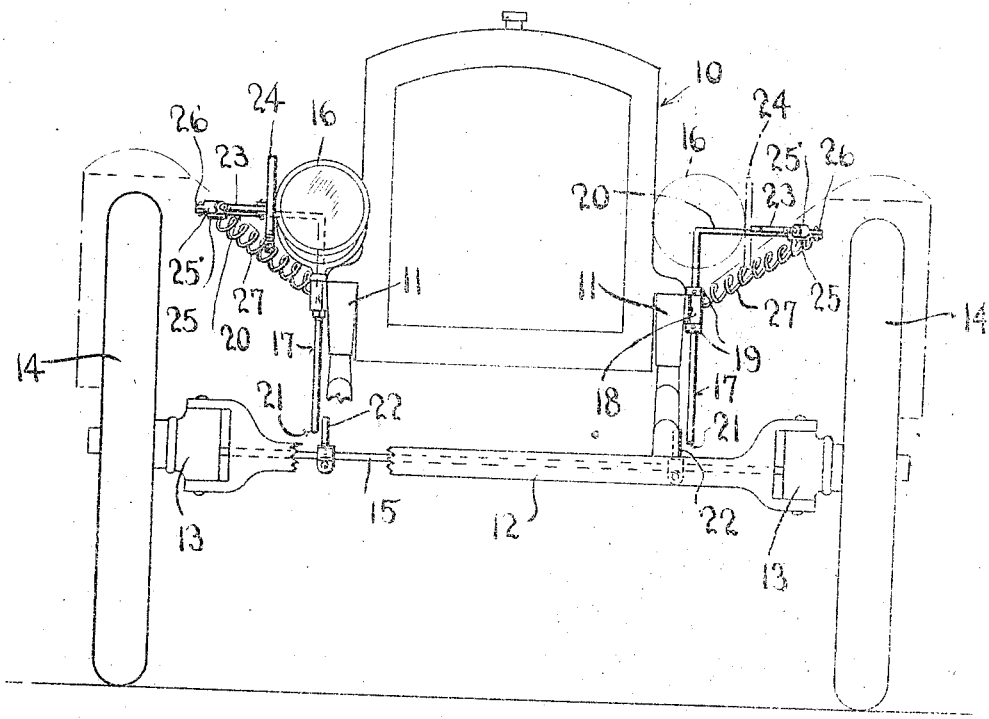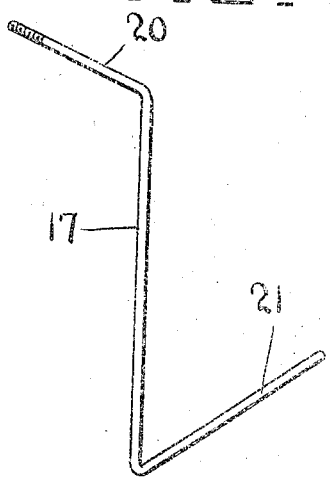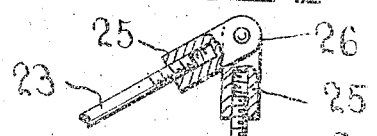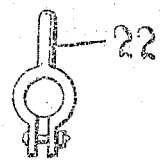

UNITED STATES PATENT OFFICE.

FRANK E. HARVEY, OF WHITE HALL, ILLINOIS.

DIRIGIBLE AUTOMOBILE-LAMP.

1,239,482.  Specification of Letters Patent.  Patented Sept. 11, 1917.

Application filed December 26, 1916. Serial No. 133,903.

*To all whom it may concern:*

Be it known that I, FRANK E. HARVEY, a citizen of the United States, residing at White Hall, in the county of Greene and State of Illinois, have invented certain new and useful Improvements in Dirigible Automobile-Lamps, of which the following is a specification.

The present invention relates to improvements in automobile lamps.

The primary object of the invention is the provision of an automobile lamp of the type known generally as dirigible lamps.

Another object of the invention is the provision of novel means for turning the lights, or reflectors pivoted to the lights so as to throw the rays in the direction in which the vehicle is about to proceed, upon the turning of the steering wheels thereof.

A further object of the invention is the provision of a dirigible lamp for automobiles or the like which will be comparatively simple and inexpensive to manufacture, reliable and efficient in use, and readily operated.

With the above and other objects in view the present invention resides in the novel features of construction, formations, combinations and arrangements of parts to be hereinafter more fully described, claimed, and illustrated in the accompanying drawings, it being understood, that various minor changes in the specific details of construction can be resorted to, within the scope of the appended claim without departing from the spirit or sacrificing any of the advantages of the invention.

In the drawings;

Figure 1 is a plan view of the preferred form of the invention wherein movable reflectors are used;

Fig. 2 is a similar view of a modified form in which pivoted lamps are used;

Fig. 3 is a detail view showing the reflector and its connection to the lamp;

Fig. 4 is a front elevation of an automobile with my improved lights applied thereto;

Fig. 5 is a detail view of the operating rod;

Fig. 6 is a horizontal sectional view taken through the hinge connection of the operating rods; and Fig. 7 is a detail view of one of the lugs carried by the spindle connecting rod.

Referring now to the accompanying drawings by corresponding characters of reference throughout the several views, the numeral 10 designates in general a portion of the forward end of an automobile including the chassis 11, front axle 12, axle spindles 13 and the front wheels 14 connected by the usual steering rod 15.

The lamps 16 are shown mounted stationary in Fig. 1 and rotatable in Fig. 2.

Referring particularly to Figs. 1, 3, 4, 5, 6 and 7 of the drawings which illustrate the preferred form of the invention, vertical rods 17 are mounted upon opposite sides of the chassis in suitable bearings 18 arranged so that the rods 17 will be permitted to rotate therein and yet be prevented from vertical displacement through the instrumentality of collars 19 which bear against the opposite ends of said bearings.

A pair of right angularly disposed arms 20 and 21 are formed upon the opposite ends of the rods 17. The arms or extensions 21 as clearly shown throughout the various figures of the drawings are directed toward the connecting rod 15, so that the wheels of the vehicle while rounding a turn will cause the connecting rod 15 thereof to shift and through the instrumentality of lugs 22 secured thereto, will impart a rotary motion to that arm 21 which is nearest the outer side of the turn, whereupon a like movement will be imparted to its adjacent arm 20, thus permitting said arms 20 to operate the reflectors in the proper direction by manipulating the links 23 which are hingedly connected to the reflectors 24 and adjustably threaded in the sockets 25 of the hinges 26. As shown in Figs. 1, 2 and 4 the extensions 21 and lugs 22 are normally arranged in spaced relation a sufficient distance so that while the steering wheels are directed straight ahead, a slight turning of the wheels caused by an uneven road or by any other means will not affect the lamp-controlling mechanism.

In order to conveniently apply this device to various models of automobiles, the hinges are provided with sockets 25 and 25' in which the free ends of the links 23 and arms 24 are threaded and where a limited space exists in which the rods must operate, their free ends can be cut off a sufficient distance to permit the desired adjustment necessary. When the sockets 25 and 25' are in contact as shown in Figs. 1, 2 and 6 the rods 21 will cease to be further manipulated toward the pins 22, therefore leaving a sufficient space between the rods 21 and 22 to allow the wheels to move a slight distance out of a straight-away course without affecting the reflectors.

As the wheels 14 turn in either direction, one of said reflectors 24 will be turned so as to deflect the rays from the lamps 16 in the direction in which the vehicle is about to proceed.

The various parts are however, held in their normal positions by the tension springs 27 which are secured preferably to the outer ends of the arms 20 and to a convenient portion of the vehicle.

Referring to Fig. 2 of the drawing the various parts thereof are identical with that shown in the other figures with the exception that the links 23 are secured directly to the lamps 16 and the reflectors 24 are dispensed with.

When this form is used the lamps which are pivoted as above mentioned turn with the wheels of the vehicle and thereby throw the light rays in the direction in which the same is about to proceed.

From the foregoing description taken in connection with the accompanying drawings it will be manifest that dirigible lamps for automobiles are provided and also novel means for controlling the same.

Having thus fully described the invention what is claimed is:

The combination in a device such as described, with a vehicle having lamps mounted thereon, movable axle spindles, a connecting rod secured to said axle spindles, lugs secured thereto, operating rods mounted upon said vehicle, arms extending from the ends of said rods, one arm of each rod being disposed in the path of one of the lugs, reflectors pivoted to said lamps, means operatively connecting the reflectors and the other of said arms, means for limiting the movement of said rods, and means for yieldingly holding the rods so the reflectors will be maintained in inoperative position except upon the turning of the vehicle wheels in predetermined directions.

In testimony whereof I affix my signature in the presence of two witnesses.

FRANK E. HARVEY.

Witnesses:
J. O. PRIEST,
CECIL TEMPLIN.